US010218774B2

(12) United States Patent
Gao et al.

(10) Patent No.: US 10,218,774 B2
(45) Date of Patent: *Feb. 26, 2019

(54) DISTRIBUTED FILE TRANSFER WITH HIGH PERFORMANCE

(71) Applicant: International Business Machines Corporation, Armonk, NY (US)

(72) Inventors: Feng Gao, Beijing (CN); Peng Hui Jiang, Beijing (CN); Jing Li, Beijing (CN); Qin Li, Beijing (CN); Guang H. Sui, Beijing (CN); Bin Xu, Beijing (CN); Jian Hua Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/956,122

(22) Filed: Apr. 18, 2018

(65) Prior Publication Data

US 2018/0227358 A1 Aug. 9, 2018

Related U.S. Application Data

(63) Continuation of application No. 15/840,444, filed on Dec. 13, 2017, now Pat. No. 10,009,412, which is a (Continued)

(51) Int. Cl.
*G06F 15/16* (2006.01)
*H04L 29/08* (2006.01)
*H04L 29/06* (2006.01)

(52) U.S. Cl.
CPC .............. *H04L 67/06* (2013.01); *H04L 67/10* (2013.01); *H04L 67/2842* (2013.01); *H04L 67/42* (2013.01)

(58) Field of Classification Search
CPC .. G06F 17/30; G06F 17/30067; G06F 9/4401; G06F 9/4416; H04L 29/06;
(Continued)

(56) References Cited

U.S. PATENT DOCUMENTS 5,987,506 A 11/1999 Carter et al.
6,167,490 A 12/2000 Levy et al.
(Continued)

FOREIGN PATENT DOCUMENTS

CN 104317736 A 1/2015

OTHER PUBLICATIONS

Gao et al., "Distributed File Transfer With High Performance", U.S. Appl. No. 15/955,791, filed Apr. 18, 2018, 38 pages.
(Continued)

*Primary Examiner* — Christopher Biagini
(74) *Attorney, Agent, or Firm* — William H. Hartwell

(57) ABSTRACT

A method for distributed file transfers with high performance and reliability includes creating, on a first Trivial File Transfer Protocol (TFTP) server, a global cache, where the global cache is used to store up to a first portion of a data file. The method further includes storing, on the first TFTP server, in the global cache, one or more continuous data blocks that have exceeded a defined first request rate threshold, where the one or more continuous data blocks make up a subset of the data blocks of the first portion of the data file. The method further includes predicting, on the first TFTP server, a next data block in the data file to be stored in the global cache and in response to predicting the next data block, storing, on the first TFTP server, the next data block in the global cache.

1 Claim, 6 Drawing Sheets

Related U.S. Application Data continuation of application No. 15/428,203, filed on Feb. 9, 2017.

(58) Field of Classification Search
CPC ......... H04L 29/06047; H04L 29/06068; H04L 29/08072; H04L 41/0213; H04L 67/06; H04L 67/10; H04L 67/2842; H04L 67/42
See application file for complete search history.

(56) References Cited

U.S. PATENT DOCUMENTS

| | | | |
|---|---|---|---|
| 7,028,096 B1 * | 4/2006 | Lee | H04N 7/17336 |
| | | | 348/E7.073 |
| 7,254,617 B2 * | 8/2007 | Schuh | G06F 17/30902 |
| | | | 707/E17.12 |
| 8,990,396 B2 | 3/2015 | Zilbershtein et al. | |
| 9,264,293 B2 | 2/2016 | Suganthi et al. | |
| 9,274,954 B1 * | 3/2016 | Bairavasundaram | ........................ |
| | | | G06F 12/0806 |
| 9,294,582 B2 * | 3/2016 | Tuliani | H04L 67/2842 |
| 2005/0177625 A1 | 8/2005 | Paek et al. | |
| 2010/0241726 A1 * | 9/2010 | Wu | G06F 17/30233 |
| | | | 709/217 |
| 2014/0258390 A1 | 9/2014 | Annamalaisami et al. | |
| 2016/0359950 A1 | 12/2016 | Reddy et al. | |
| 2017/0085622 A1 | 3/2017 | Gopinath et al. | |

OTHER PUBLICATIONS

IBM, "List of IBM Patents or Patent Applications Treated as Related", Appendix P, 2 pages, dated Apr. 19, 2018.
Gao et al., "Distributed File Transfer With High Performance", U.S. Appl. No. 15/428,203, filed Feb. 9, 2017, 44 pages.
Gao et al., "Distributed File Transfer With High Performance", U.S. Appl. No. 15/794,302, filed Oct. 26, 2017, 38 pages.
Gao et al., "Distributed File Transfer With High Performance", U.S. Appl. No. 15/840,444, filed Dec. 13, 2017, 38 pages.

* cited by examiner

DISTRIBUTED FILE TRANSFER WITH HIGH PERFORMANCE

BACKGROUND

The present invention relates generally to the field of file transfers, and more particularly to file transfers in large scale environments.

Trivial File Transfer Protocol (TFTP) is a simple, lockstep, file transfer protocol that allows a client to request a file from, or transmit a file onto, a remote host. TFTP is mainly used during a device bootstrap process for downloading device OS/firmware and configuration files. TFTP is typically used for copying bootstrap and configuration files between nodes belonging to the same local area network (LAN).

TFTP is used along with boot protocols such as bootstrap protocol (BOOTP) and dynamic host configuration protocol (DHCP) to initialize devices. When an internet protocol (IP) enabled node boots up, the node gets an IP address and other device and network related parameters through BOOTP or DHCP. As part of these parameters, the client also receives the TFTP server address, bootstrap file and configuration file details (file name and directory location). The client then uses the TFTP protocol to download the bootstrap image and configuration files from the TFTP server.

SUMMARY

Embodiments of the present invention disclose a method, computer program product, and system for distributed file transfers with high performance and reliability. The method includes creating, on a first Trivial File Transfer Protocol (TFTP) server, a global cache, wherein the global cache is used to store up to a first portion of a data file. The method further includes storing, on the first TFTP server, in the global cache, one or more continuous data blocks that have exceeded a defined first request rate threshold, where the one or more continuous data blocks make up a subset of the data blocks of the first portion of the data file. The method further includes predicting, on the first TFTP server, a next data block in the data file to be stored in the global cache and in response to predicting the next data block, storing, on the first TFTP server, the next data block in the global cache.

DETAILED DESCRIPTION

Figure 1:
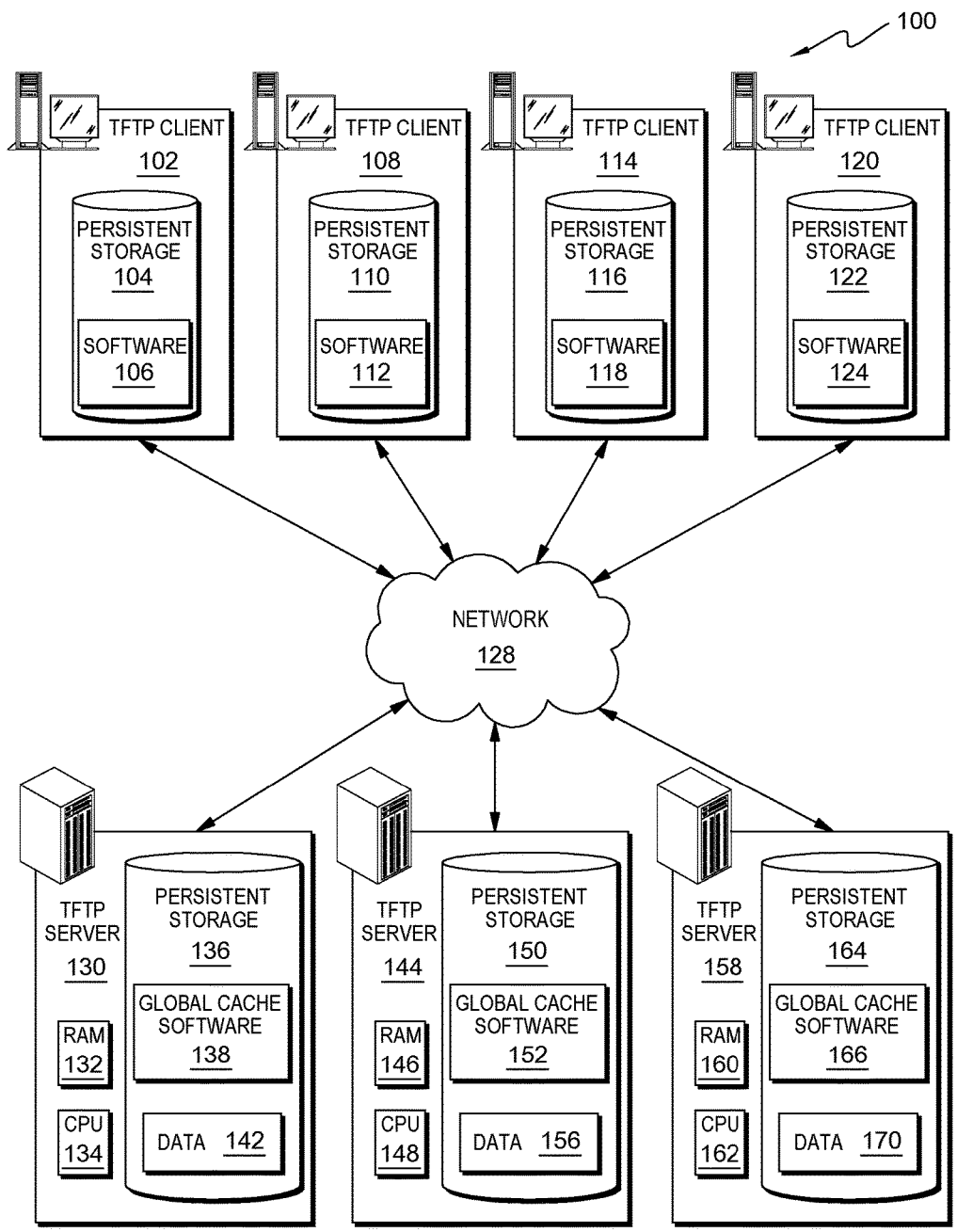
FIG. 1 is a functional block diagram illustrating a distributed file transfer environment, in an embodiment in accordance with the present invention.

Embodiments in accordance with the present invention recognize a need for a method for distributed file transfers with high performance and reliability.

In Trivial File Transfer Protocol (TFTP), a transfer is typically initiated by a client issuing a request to read or write a particular file on a server. Both devices involved in a transfer are considered senders and receivers. One device sends data and receives acknowledgments, and the other device sends acknowledgments and receives data. A TFTP request can optionally include a set of negotiated transfer parameters proposed by the client the block size. Upon granting the request, the file is sent in fixed length blocks of 512 bytes by default or the number specified in the negotiated block size. Each block of transferred data, which is usually carried within a single IP packet in order to avoid IP fragmentation, must be acknowledged by an acknowledgment packet before the next block can be sent. A data packet of less than 512 bytes or the agreed block size option signals termination of a transfer. In the event that a packet is lost in the network, the intended recipient will timeout and may retransmit the last packet (which may be data or an acknowledgment), thus causing the sender of the lost packet to retransmit that lost packet. The sender keeps just one packet on hand for retransmission, because the lock step acknowledgment guarantees that all older packets have been correctly received.

One type of TFTP transfer is a traditional master-client configuration where one or more TFPT clients are assigned to a single TFTP server. When using a traditional master-client configuration in large environments with thousands of nodes, multiple TFTP servers can be used and can have assigned groups such as 1024 nodes, or clients, per TFTP server. In this type of configuration, each TFTP server can accept requests from the assigned group, however, the configuration does not provide high availability. When a TFTP server goes down, the entire assigned group is affected. Throughput is also an issue. For example, in a configuration with 1024 nodes per group and a file size of 16 gigabytes, the throughput at the TFTP server would be severely degraded and the TFTP server would become a bottleneck.

Another type of TFTP transfer is a traditional type master-client configuration using multiple TFTP servers (i.e., TFTP worker servers, also referred as worker nodes), behind the master, or primary, TFTP server. This type of configuration can improve the performance of file buffers and the throughput of reading the file from disk with the additional TFTP worker servers, however all data must flow thorough the master TFTP server which can be a bottleneck in a very large environment regardless of the network speed.

Embodiments of the present invention provide a computer-implemented method for distributed file transfers with high performance and reliability. The method includes an TFTP server cluster, wherein each TFTP server in the TFTP server cluster is fully symmetric of one another. For example, there is no distinct relationship between the nodes in the cluster (e.g., there are no primary nodes and worker nodes). Every TFTP server in the cluster can receive TFTP requests from TFTP clients directly. The method also includes the TFTP client selecting an TFTP server by using a Consistent Hash Algorithm. For example, upon executing a boot sequence, a TFTP client can broadcast a preboot execution environment (PXE) request to a Dynamic Host Configuration Protocol (DHCP) server. Upon receiving the DHCP request, the DHCP server can use the consistent hash algorithm to randomly select or redirect the TFTP client to a TFTP server. This random selection can make sure the workload balance and will remove any potential bottlenecks from any one TFTP server in the cluster.

The method further includes dividing the requested data into several parts and caching among multiple TFTP servers. For example, a requested file that can be downloaded by a TFTP client is divided among a plurality of TFTP servers. Additionally, all cached data is added to a global distributed cache, also referred to as a global cache, once the request rate reaches a certain threshold. For example, upon determining that the request rate of a certain data block has reached a pre-defined first threshold, a global cache software adds the data block to a global cache to speed up the transfer rate and reduce disk reads. Each TFTP server in the cluster can maintain a global cache for the portion of the divided data that the TFTP server is responsible for. In another example embodiment, two or more TFTP servers can each contain multiple copies of the data blocks of the first portion of the data file on a plurality of TFTP servers to enable a high availability for reading blocks in the global cache. in the event one of the TFTP server fails unexpectedly. In one example embodiment, a global cache software can append metadata to the last data block that can direct the TFTP client to the next data block, also referred to as the next logical block, on a different TFTP server. For example, a TFPT client requesting data on a first TFTP server can reach the end of the cached data (e.g., divided data) for that file on the first TFPT server. Upon transmitting the last data block, a global cache software can append metadata to the last block that directs the TFTP client to a second TFTP server where the next data block is cached. Stated another way, the global cache software can randomly select a second TFTP server, wherein the second TFTP server contains a second portion of the data file. In another example embodiment, a global cache software can utilize a hash algorithm to determine the location of the next divided data on a next TFTP server. For example, a global cache software can determine the next TFTP server in the cluster that contains the next data block in the transfer.

The method further includes adjusting the adjusting the global cache using a sliding window. For example, as one or more TFTP clients request certain data blocks on a first TFTP server, a global cache software will monitor the read requests. Upon determining that the read requests for a particular data block have reached above a certain level, the global cache software can add the data block to the global cache. As the one or more TFTP clients request a next data block, the request rate for the tail end data blocks will fall below a second threshold level. Upon determining that the read requests for a tail end data block have fallen below a certain level, the global cache software can remove the tail end data block from the global cache.

Embodiments of the present invention can improve distributed file transfers with high performance and reliability by checking for requested data in a global distributed cache before reading the data from a disk, thus improving performance of reading from disk and increasing the throughput and I/O.

Embodiments in accordance with the present invention will now be described in detail with reference to the Fig.

FIG. 1 is a functional block diagram, generally designated 100, illustrating a distributed file transfer environment, in an embodiment in accordance with the present invention. It should be appreciated that FIG. 1 provides only an illustration of one implementation and does not imply any limitations with regard to the environments in which different embodiments may be implemented. Many modifications to the depicted environment may be made. In one example embodiment, distributed file transfer environment 100 consists of many TFTP servers with thousands of TFTP clients.

Distributed file transfer environment 100 includes TFTP clients 102, 108, 114, 120 TFTP server 130, 144, 158 and other computing devices (not shown), all interconnected over network 128. TFTP client 102 may be a Web server, or any other electronic device or computing system, capable of processing program instructions and receiving and sending data. In some embodiments, TFTP client 102 may be a laptop computer, a tablet computer, a netbook computer, a personal computer (PC), a desktop computer, a personal digital assistant (PDA), a smart phone, or any programmable electronic device capable of communicating over a data connection to network 128. In other embodiments, TFTP client 102 may represent server computing systems utilizing multiple computers as a server system, such as in a distributed computing environment. In general, TFTP client 102 is representative of any electronic device or combinations of electronic devices capable of executing machine-readable program instructions and communicating with TFTP server 130, 144, and 158 via network 128 and with various components and devices (not shown) within distributed file transfer environment 100.

TFTP client 102 includes persistent storage 104. Persistent storage 104 may, for example, be a hard disk drive. Alternatively, or in addition to a magnetic hard disk drive, persistent storage 104 may include a solid state hard drive, a semiconductor storage device, read-only memory (ROM), erasable programmable read-only memory (EPROM), flash memory, or any other computer-readable storage medium that is capable of storing program instructions or digital information. TFTP client 102 may include internal and external hardware components, as depicted and described in further detail with respect to FIG. 6.

Software 106 is stored in persistent storage 104, which also includes operating system software (not shown), as well as software that enables TFTP client 102 to initiate a file transfer from an TFTP server cluster (e.g., TFTP server 130, 144, and 158), and communicate with other computing devices (not shown) of distributed file transfer environment 100 over a data connection on network 128. In other example embodiments, software 106 may be components of an operating system software.

Software 106 is a computer program, or sets of computer programs, that are stored in persistent storage 104. In one example embodiment, software 106 enables TFTP client 102 to download an operating system image from the TFTP server cluster (e.g., TFTP server 130, 144, and 158), over a data connection to network 128.

TFPT client 108 is also included in distributed file transfer environment 100. In the present example embodiment, TFPT client 108 is representative of TFTP client 102, including persistent storage 110 that contains software 112. Software 112 enables TFTP client 108 to download an operating system image from the TFTP server cluster (e.g., TFTP server 130, 144, and 158), over a data connection to network 128.

TFPT client 114 is also included in distributed file transfer environment 100. In the present example embodiment, TFPT client 114 is representative of TFTP client 102, including persistent storage 116 that contains software 118. Software 118 enables TFTP client 114 to download an operating system image from the TFTP server cluster (e.g., TFTP server 130, 144, and 158), over a data connection to network 128.

TFPT client 120 is also included in distributed file transfer environment 100. In the present example embodiment, TFPT client 120 is representative of TFTP client 102, including persistent storage 122 that contains software 124. Software 124 enables TFTP client 120 to download an operating system image from the TFTP server cluster (e.g., TFTP server 130, 144, and 158), over a data connection to network 128. The present example embodiment assumes there are many TFTP clients (e.g., a thousand or more), in distributed file transfer environment 100.

In FIG. 1, network 128 is shown as the interconnecting fabric between TFTP client 102, 108, 114, and 120, and TFTP server 130, 144, and 158, and with various components and devices (not shown) within distributed file transfer environment 100. In practice, the connection may be any viable data transport network, such as, for example, a LAN or WAN. Network 128 can be for example, a local area network (LAN), a wide area network (WAN) such as the Internet, or a combination of the two, and include wired, wireless, or fiber optic connections. In general, network 128 can be any combination of connections and protocols that will support communications between TFTP client 102, 108, 114, and 120, and TFTP server 130, 144, and 158, and with various components and devices (not shown) within distributed file transfer environment 100.

TFTP server 130 is included in distributed file transfer environment 100. TFTP server 130 includes random access memory (RAM) 132, central processing unit (CPU) 134, and persistent storage 136. TFTP server 130 may be a Web server, or any other electronic device or computing system, capable of processing program instructions and receiving and sending data. In some embodiments, TFTP server 130 may be a laptop computer, a tablet computer, a netbook computer, a personal computer (PC), a desktop computer, a personal digital assistant (PDA), a smart phone, or any programmable electronic device capable of communicating over a data connection to network 128. In other embodiments, TFTP server 130 may represent server computing systems utilizing multiple computers as a server system, such as in a distributed computing environment. In general, TFTP server 130 is representative of any electronic devices or combinations of electronic devices capable of executing machine-readable program instructions and communicating with TFTP client 102 via network 128 and with various components and devices (not shown) within distributed file transfer environment 100.

TFTP server 130 includes persistent storage 136. Persistent storage 36 may, for example, be a hard disk drive. Alternatively, or in addition to a magnetic hard disk drive, persistent storage 136 may include a solid state hard drive, a semiconductor storage device, read-only memory (ROM), erasable programmable read-only memory (EPROM), flash memory, or any other computer-readable storage medium that is capable of storing program instructions or digital information. Global cache software 138 and data 142 are stored in persistent storage 136. Persistent storage 136 also includes operating system software (not shown), as well as software that enables TFTP server 130 to detect and establish a connection to TFTP client 102, 108, 114, and 120, server 144, and 158 and communicate with other computing devices (not shown) of distributed file transfer environment 100 over a data connection on network 128.

Global cache software 138 is a computer program, or set of computer programs, such as application program interface (APIs), that is stored in persistent storage 136. Global cache software 138 is used during file transfers to place data blocks in a global cache when read requests for the data blocks reach a certain threshold (e.g., the first threshold). For example, as TFTP client 102, 108, 114, and 120 are booting up at the same time, global cache software 138 detects the request rate for a certain data block of data 142 exceeding a certain threshold. Global cache software 138 then adds the requested data block to the global cache to reduce the number of reads from persistent storage 136. Metadata is appended to the last block directing TFTP client 102, 108, 114, and 120 to a next data block on TFTP server 130, 144, and/or 158.

Data 142 is also contained in persistent storage 136. In the example embodiment of FIG. 1, data 142 is a part of a larger operating system image that is divided up among the TFTP server cluster (e.g., TFTP server 130, 144, and 158). For example, TFTP server 130 can contain a portion of the operating system image in persistent storage 136, TFTP server 144 can contain another portion of the operating system image in persistent storage 150, and TFTP server 158 can contain the final portion of the operating system image in persistent storage 164.

TFPT server 144 is also included in distributed file transfer environment 100. In the present example embodiment, TFPT server 144 is representative of TFTP server 130, including RAM 146, CPU 148, and persistent storage 150. Persistent storage 150 contains a global cache software 152 and data 156. Persistent storage 150 also includes operating system software (not shown), as well as software that enables TFTP server 144 to detect and establish a connection to TFTP client 102, 108, 114, and 120, server 130, and 158 and communicate with other computing devices (not shown) of distributed file transfer environment 100 over a data connection on network 128.

Global cache software 152 is a computer program, or set of computer programs, such as application program interface (APIs), that is stored in persistent storage 150. Global cache software 152 is used during file transfers to place data blocks in a global cache when read requests for the data blocks reach a certain threshold, such as the first threshold. For example, upon reaching the end of a data block on a previous TFTP server (e.g., TFTP server 130), TFTP client 102 is directed to the next data block stored on TFTP server 144. For example, global cache software 138 on TFTP server 130 can apply a hash algorithm to determine the next TFTP server in the transfer. Global cache software 138 can then add metadata to the last data block that instructs TFTP client 102 to TFTP server 144.

Data 156 is also contained in persistent storage 150. Continuing with the previous example, data 156 is a portion of the divided data stored among TFTP server 130, 144, and 158.

TFPT server 158 is also included in distributed file transfer environment 100. In the present example embodiment, TFPT server 158 is representative of TFTP server 130 and 144, including RAM 160, CPU 162, and persistent storage 164. Persistent storage 164 contains a global cache software 166 and data 170. Persistent storage 164 also includes operating system software (not shown), as well as software that enables TFTP server 158 to detect and establish a connection to TFTP client 102, 108, 114, and 120, server 130, and 144 and communicate with other computing devices (not shown) of distributed file transfer environment 100 over a data connection on network 128.

Global cache software 166 is a computer program, or set of computer programs, such as application program interface (APIs), that is stored in persistent storage 164. Global cache software 166 is used during file transfers to place data blocks in a global cache when read requests for the data blocks reach a certain threshold, such as the first threshold. For example, upon reaching the end of a data block on a previous TFTP server (e.g., TFTP server 144), TFTP client 102 is directed to the next data block stored on TFTP server 158. For example, global cache software 152 on TFTP server 144 can apply a hash algorithm to determine the next TFTP server in the transfer. Global cache software 152 can then add metadata to the last data block that instructs TFTP client 102 to TFTP server 158.

Data 170 is also contained in persistent storage 164. Continuing with the previous example, data 170 is a portion of the divided data stored among TFTP server 130, 144, and 158. In other example embodiments, TFTP server 130, 144, and 158 can contain the entire data, such as an operating system image. A global cache software can then identify portions of the operating system image on TFTP server 130, 144, and 158 to be downloaded by one or more TFTP clients. In other example embodiments, global cache software on TFTP server 130, 144, and 158 can dynamically adjust the identified portions operating system image, For example, global cache software 152 can determine the next server in the cluster is currently experiencing high downloads and can adjust the divided portion of the operating system image to compensate. Upon detecting that the download rate has dropped below a certain threshold (e.g., the second threshold), global cache software 152 can then direct the client to the next server.

Figure 2:
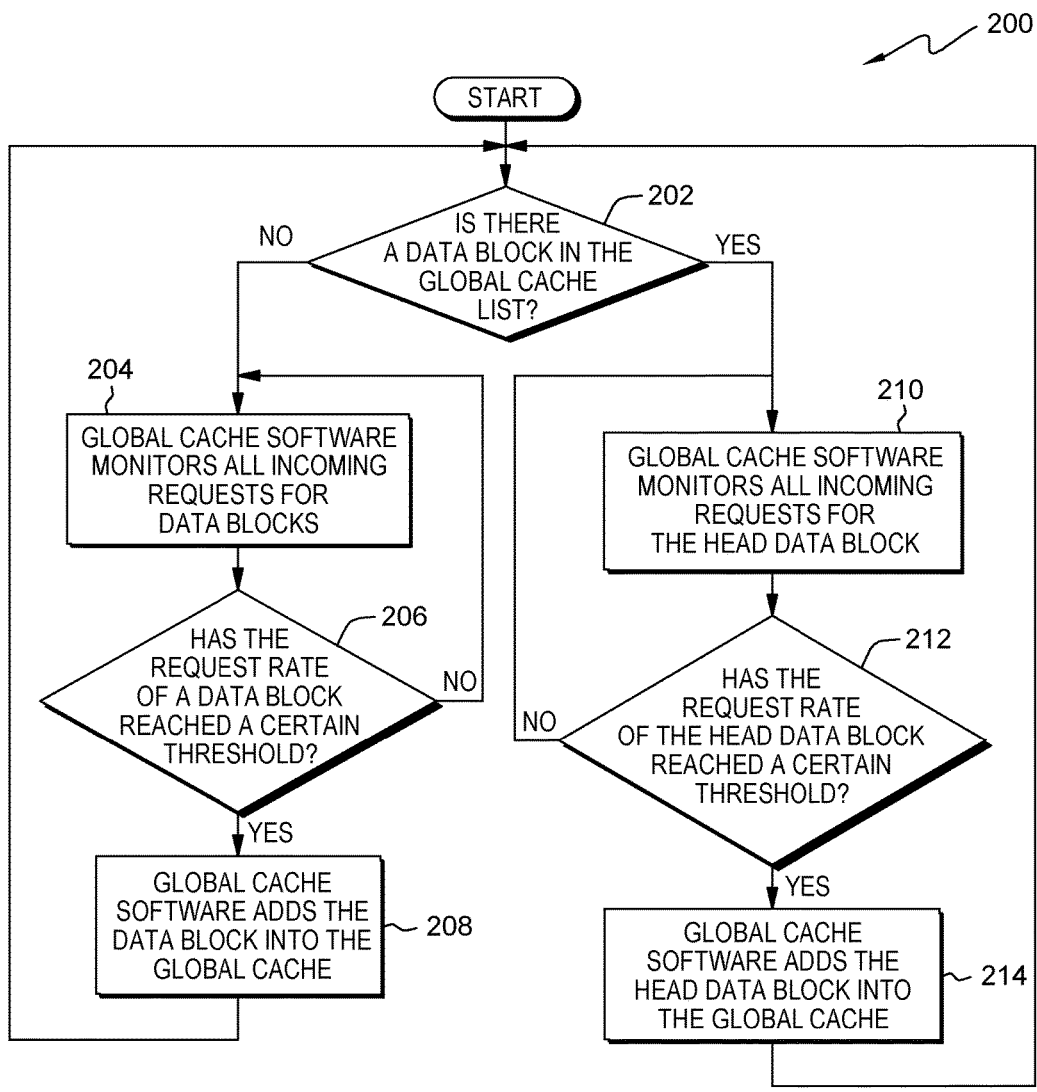
FIG. 2 is a flowchart depicting operational steps of a global cache software, on a TFTP server cluster within the distributed file transfer environment of FIG. 1, for inserting a head data block in a global cache, in an embodiment in accordance with the present invention.

FIG. 2 is a flowchart, generally designated 200, depicting operational steps of a global cache software, on a TFTP server cluster within the distributed file transfer environment of FIG. 1, for inserting a head data block in a global cache, in an embodiment in accordance with the present invention. In one example embodiment, a plurality of TFTP clients (e.g., TFTP client 102, 108, 114, and 120), begin requesting data blocks from one or more TFTP servers (e.g., TFTP server 130, 144, and 158), in a server cluster within distributed file transfer environment 100. For example, TFTP client 102, 108, 114, and 120 request one or more data blocks of an operating system image stored among the cluster.

In decision step 202, global cache software 138 determines if there is a data block in the global cache list. For example, when the request rate of a particular data block reaches a certain threshold such as the first threshold, global cache software 138 will add the data block to the global cache to speed up, adapt, or optimize, the desired transfer rate and reduce reads from one or more hard drives. In one example embodiment, global cache software 138 can check the global cache upon receiving a request for a data block. In other example embodiments, global cache software 138 can check the global cache at random or configured intervals.

If global cache software 138 determines if there is no data block in the global cache list ("No" branch, decision 202), global cache software 138 monitors all incoming requests for data blocks as depicted in step 204. For example, upon determining that there are no data blocks in the global cache, global cache software 138 can continue monitoring the incoming requests for data blocks of the portion of the divided operating system image (e.g., data 142), stored in persistent storage 136.

In decision step 206, global cache software 138 determines if the request rate of a data block has reached a certain threshold. For example, global cache software 138 determines that the request rate of a certain data block has reached a defined threshold, such as the first threshold set by an administrator, or by global cache software 138. The defined threshold is reached when a plurality of TFTP clients request the data block in a short period of time. In one example embodiment, an administrator can set the first threshold level using a user interface on TFTP server 130. In another example embodiment, the request rate of the first threshold can be dynamically set and/or adjusted by global cache software 138 based on the current throughput of: (i) the network bandwidth, (ii) a current network throughput, and (iii) the current hard disk throughput.

If global cache software 138 determines that the request rate of a data block has not reached a certain threshold ("No" branch, decision 206), global cache software 138 continues to monitor all incoming requests for data blocks as depicted in step 204. For example, global cache software 138 determines that the request rate for a given data block is below the previously set first threshold level. Upon determining that the request rate is not above the required first threshold level to add the data block to the global cache, global cache software 138 continues to monitor the incoming requests for data blocks. In another example embodiment, global cache software 138 can add requested data blocks to the global cache when the request rate for a certain data block is low.

If global cache software 138 determines that the request rate of a data block has reached a certain threshold ("Yes" branch, decision 206), global cache software 138 then adds the requested data block into the global cache as depicted in step 208. For example, global cache software 138 receives multiple requests for a data block of data 142. Upon determining that the request rate to the data block exceeds the first threshold, global cache software 138 adds the data block to the global cache then repeats decision 202 as depicted in FIG. 2.

If global cache software 138 determines if there is a data block in the global cache list ("Yes" branch, decision 202), global cache software 138 monitors all incoming requests for the head data block as depicted in step 210. In other words, in step 210, global cache software 138 monitors incoming file requests to determine the first data block of the requested file that is not included in the global cache. For example, global cache software 138 determines that a plurality of data blocks (e.g., data block 301, 302, 303, 304, 308, 309, and 310), are already placed in global cache 300 as depicted in global cache 300 of FIG. 3A. The "head data block" of the file would be the first data block not included in global cache 300 (for example, data block 305, discussed below.

In decision step 212, global cache software 138 determines if the request rate of the head data block has reached a certain threshold. For example, global cache software 138 determines if the request rate for the head data block, also referred to as the next data block, in the file transfer has reached a certain request rate threshold, (e.g., the first threshold), wherein the first request rate threshold is a configurable limit that defines when data blocks are to be added to the global cache.

If global cache software 138 determines that the request rate of the head data block has not reached a certain threshold ("No" branch, decision 212), global cache software 138 continues to monitor all incoming requests for the head data block as depicted in step 210. For example, global cache software 138 determines that the request rate for the head data block is below the previously set first threshold level. Upon determining that the request rate is not above the required first threshold level to add the head data block to the global cache, global cache software 138 continues to monitor the incoming requests for the data block. In another example embodiment, global cache software 138 can add one or more requested head data blocks to the global cache when the request rate for the one or more requested head data blocks is low.

If global cache software 138 determines that the request rate of the head data block has reached a certain threshold ("Yes" branch, decision 212), global cache software 138 then adds the requested head data block into the global cache as depicted in step 214. For example, global cache software 138 receives multiple requests for one or more head data blocks of data 142. Upon determining that the request rate of the one or more head data blocks exceed the first threshold level, global cache software 138 then adds the head data blocks (e.g., head data block 305 and 312 as depicted in FIG. 3B) to the global cache then repeats decision 202 as depicted in FIG. 2.

In a deployment of large scale cluster, such as distributed file transfer environment 100, the cluster nodes (e.g., TFTP client 102, 108, 114, and 120), will request access to the same file. Over a certain time period, the offset of reading the file by most of the nodes in the cluster will be in a certain consecutive interval, and as time progresses, the read offset will move forward. Some embodiments of the present invention include the following features: (i) the global cache only includes the consecutive blocks, and the number of consecutive blocks can be set to N, if N=1, the algorithm will be simplified as LRU (Least Recently Used); (ii) the global cache can include multiple consecutive intervals (e.g., data block 301, 302, 303, 304, and 308, 309, 310 in FIG. 3A), the number of consecutive intervals can be set to M, where M depends on N and the global maximum cache SIZE; (iii) a move-in rule where the global cache software counts the access frequency of the data block (e.g., X1.start~X2.start), and if the access frequency of the data block reaches the first threshold level, the data blocks will be moved into global cache and the next value, also referred to as the next possible data block, being counted will be set to X2.start~X3.start (e.g., data block 305 and 312 moved into global cache 300 in FIG. 3B); and (iv) a move-out rule where the access frequency of the first data block moved into the global cache, that is part of a consecutive interval, drops below the second threshold, the first data block will be moved out the global cache.

Figure 3A:
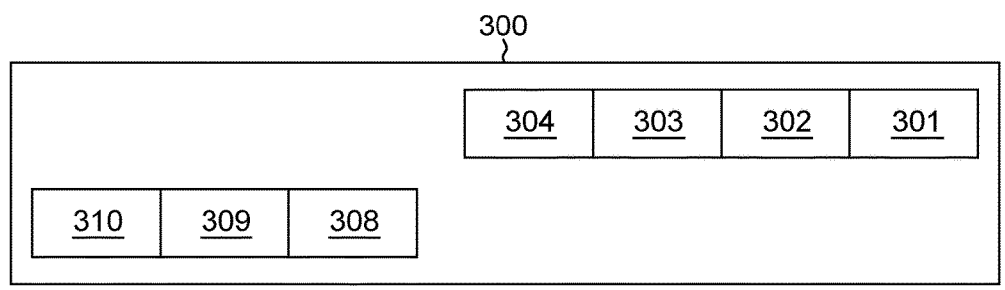
FIGS. 3A and 3B depict a head data block being inserted in a global cache by a global cache software, within the distributed file transfer environment of FIG. 1, in an embodiment in accordance with the present invention.
Figure 3B:
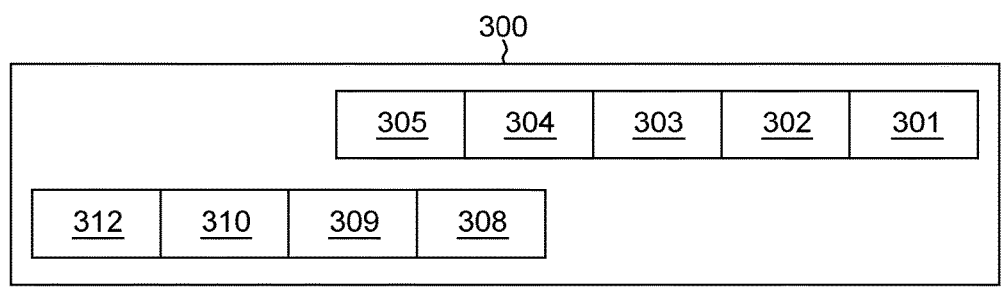

In another example embodiment, global cache software 138 can use the move-in rule to predict the next data block as shown in the example embodiment of FIG. 3A and FIG. 3B. For example, as the request rate of the sliding window (e.g., data block 301, 302, 303, 304, and 308, 309, 310 as depicted in FIG. 3A), changes, global cache software 138 can predict when requests for the next data block will be likely to exceed the defined first request rate threshold. For example, as the request rate for data block 304 and 310 reach a defined threshold, such as the first threshold level, and are added into global cache 300, global cache software 138 can begin monitoring data block 305 and 312. Upon determining that the request rate of data blocks 305 and 312 have reached the first threshold level, global cache software 138 can predict when data block 305 and 312 will need to be added to global cache 300.

Figure 4:
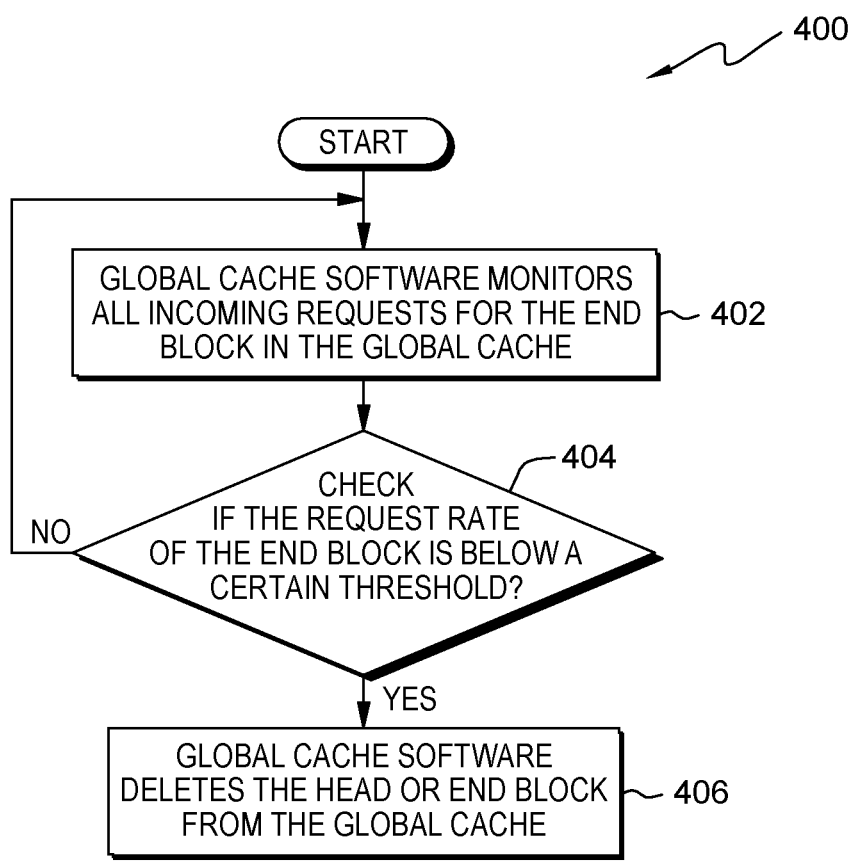
FIG. 4 is a flowchart depicting operational steps of a global cache software, on a TFTP server cluster within the distributed file transfer environment of FIG. 1, for removing a tail end data block from a global cache, in an embodiment in accordance with the present invention.

FIG. 4 is a flowchart, generally designated 400, depicting operational steps of a global cache software, on a TFTP server cluster within the distributed file transfer environment of FIG. 1, for removing tail end data block from a global cache, in an embodiment in accordance with the present invention. Continuing the example embodiment of FIG. 2, where global cache software 138 uses the move in rule to add multiple consecutive data block 301, 302, 303, 304, 305, and 308, 309, 310, 312 as depicted in FIGS. 3A and 3B, global cache software 138 can then use the move out rule to drop, or remove, data blocks that fall below a certain threshold, such as the second threshold level.

Figure 5A:
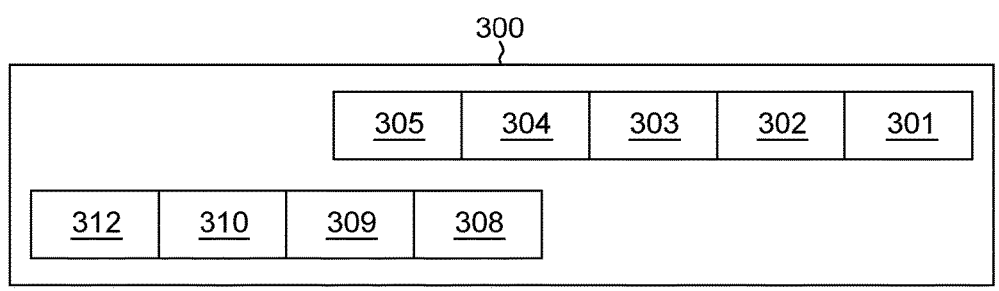
FIGS. 5A and 5B depict a tail end data block being removed from a global cache by a global cache software, within the distributed file transfer environment of FIG. 1, in an embodiment in accordance with the present invention.

In step 402, global cache software 138 monitors all incoming requests for the end block in the global cache. For example, global cache software 138 monitors data block 301 and 308. In the example embodiment of FIG. 5A, data block 301 and 308 are the first data blocks added to the multiple consecutive intervals of data block 301, 302, 303, 304, 305, and 308, 309, 310, 312 by global cache software 138. In other example embodiments, the number of multiple consecutive intervals can be configured by an administrator, or dynamically by global cache software 138. For example, a network administrator can set a parameter on TFTP server 130 that global cache software 138 can use to allow a certain number of multiple consecutive intervals of data blocks to be placed in global cache 300.

Figure 5B:
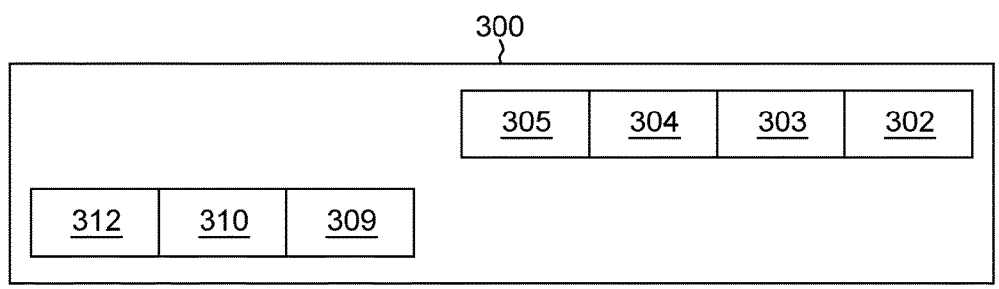

In decision step 404, global cache software 138 checks if the request rate of the end block is below a certain threshold. For example, global cache software determines if the request rate for data block 301 and/or 308 has fallen below a configured threshold, such as the second threshold level. If global cache software 138 determines that the request rate of the end block is not below a certain threshold ("No" branch, decision 404), global cache software 138 continues to monitor all incoming requests for the end blocks in the global cache as depicted in step 402. If global cache software 138 determines that the request rate of the end block is below a certain threshold ("Yes" branch, decision 404), global cache software 138 deletes the end block from the global cache as depicted in step 406. For example, referring to FIG. 5A, global cache software 138 determines that the request rate for data block 301 and 308 is below the second threshold level and removes data block 301 and 308 from global cache 300 as depicted in FIG. 5B.

Embodiments of the present invention provide an advantage over the traditional master-client configurations and the traditional master-client configurations using multiple TFTP servers by solving the buffer bottleneck problem of a single HOST (i.e., TFTP server), by improving the size of the read buffer (e.g., by implementing global cache 300) and enhancing the performance of the valid buffer. For example, embodiments of the present invention can do this by only placing data blocks in global cache 300 that are in high demand, and removing data blocks that are low in demand. Global cache 300 also fixes buffer volume problems seen in the traditional master-client configurations when many (e.g., thousands), of TFTP clients request the same file. For example, as more TFTP clients execute a boot sequence and request a file from the master TFTP server, the buffer volume of the master TFTP server becomes a bottleneck. By utilizing a TFTP server cluster (e.g., TFTP server 130, 144, and 158), the demand on buffers can be divided among the plurality of the TFTP servers.

Embodiments of the present invention provide an advantage utilizing a slide-in and slide-out rule to create a sliding window function that improves the buffer hit rate of the global cache. The buffer hit rate in traditional master-client configurations does not allow the file to be completely hit when file size is greater than the valid buffer of the single HOST (i.e., TFTP server). Embodiments of the present invention improve the whole buffer function by allowing a file to be completely buffered across the entire cluster, which also improves the hit rate. To compare with the traditional methods previously described, if the file size is greater than the valid buffer of the host (i.e., TFTP server), and the file size is greater than the global buffer, the slide window function can be effective in a large cluster deployment. For example, most of the nodes (TFTP clients), will access the same file areas in a certain interval. The reading rate threshold (e.g., the first threshold), for the head-most block in the global cache can be configured. A small reading rate threshold can greatly enhance the global cache hit rate. As a result, the global buffer will grow with the growth of the TFTP server, and the sequential buffer file will grow according to the sequential file rule. According to embodiments of the present invention, if the first threshold level is low enough and all nodes in the environment access the host at the same time, then all nodes except the first node—which needs to read from disk—will read from the global cache. For example, if the first threshold level is 10 percent, then the remaining 90 percent of clients will read from the global buffer. In some embodiments, the best scenario is a global cache hit rate of 100%. For example, in a best case scenario the average time required for 1024 nodes to transfer data can be seen below:

$$\frac{(16\ G * 1024)}{1\ G} = 4.5\ \text{hours}$$

In this example, 100 percent of the requested data is read from the global cache with an access rate of 16 Gigabytes per second for 1024 nodes and an average access rate of 1 Gigabyte per second for each node. Therefore, the time required for 1024 nodes would be 4.5 hours.

Embodiments of the present invention can be applied to any file transfer protocol (FTP) environment comprised of a FTP server cluster, wherein each FTP server in the FTP server cluster is fully symmetric of one another.

Figure 6:
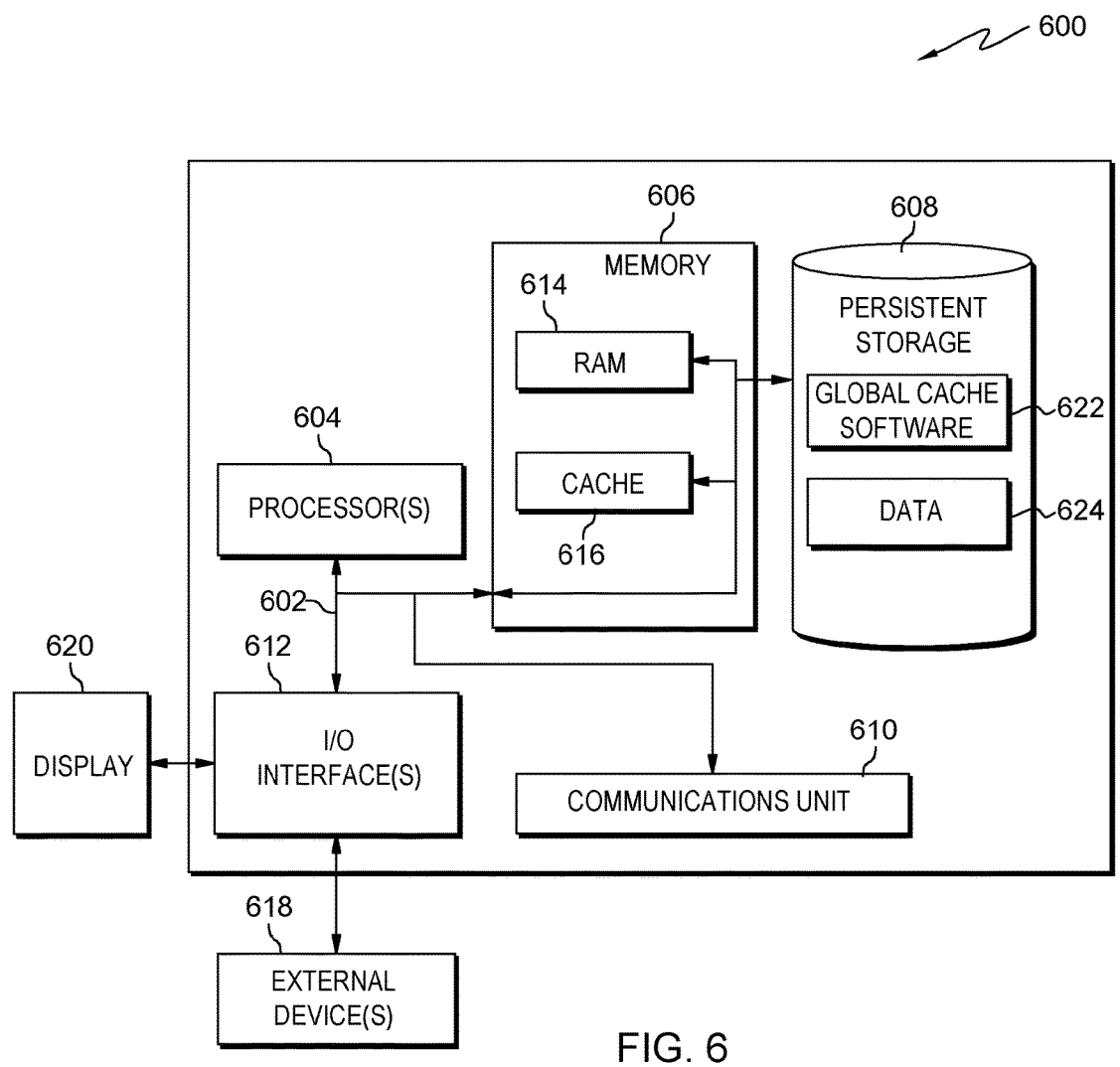
FIG. 6 depicts a block diagram of components of the TFTP server executing the global cache software, in an embodiment in accordance with the present invention.

FIG. 6 depicts a block diagram, generally designated 600, of components of the TFTP server executing the global cache software, in an embodiment in accordance with the present invention. It should be appreciated that FIG. 6 provides only an illustration of one implementation and does not imply any limitations with regard to the environments in which different embodiments may be implemented. Many modifications to the depicted environment may be made.

TFTP server 130 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Global cache software 622 and data 624 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of network 128 and TFTP client 102, 108, 114 and 120, and TFTP server 144, and 158. In these examples, communications unit 610 includes one or more network interface cards. Communications unit 610 may provide communications through the use of either or both physical and wireless communications links. Global cache software 622 and data 624 may be downloaded to persistent storage 608 through communications unit 610.

I/O interface(s) 612 allows for input and output of data with other devices that may be connected to TFTP server 130. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., global cache software 622 and data 624, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

What is claimed is:

1. A computer system comprising:
one or more computer processors;
one or more computer readable storage media;
program instructions stored on the computer readable storage media for execution by at least one of the one or more processors, the program instructions comprising:
program instructions to create, on a first Trivial File Transfer Protocol (TFTP) server, a global cache, wherein the global cache stores up to a first portion of a data file, wherein the data file is divided into a plurality of portions, including the first portion, and wherein the plurality of portions are stored among a plurality of TFTP servers, including a second portion of the data file that is stored on a second TFTP server;
program instructions to store, on the first TFTP server, in the global cache, one or more continuous data blocks that have exceeded a defined first request rate threshold, wherein the one or more continuous data blocks make up a subset of the data blocks of the first portion of the data file, and wherein the program instructions to store, in the global cache, the one or more continuous data blocks that have exceeded the defined first request rate threshold comprise:
program instructions to monitor, on the first TFTP server, a request rate for a particular data block,
program instructions to determine, on the first TFTP server, if the request rate for the particular data block exceeds the defined first request rate threshold, wherein the defined first request rate threshold is a configurable limit that defines when data blocks are to be added to the global cache, and wherein the defined first request rate is adapted to optimize a transfer rate and reduce reads from one or more hard drives, and
program instructions to add, on the first TFTP server, the particular data block to the global cache based on the determining;
program instructions to predict, on the first TFTP server, a next data block in the data file to be stored in the global cache, wherein the program instructions to predict the next data block comprise:
program instructions to, upon adding a particular data block to the global cache, monitor, on the first TFTP server, the request rate of the next data block, wherein the next data block is the next logical block of the data blocks of the first portion of the data file following the one or more continuous data blocks stored in the global cache, and
program instructions to, upon monitoring the request rate of the next data block, predict, on the first TFTP server, when requests for the next data block will be likely to exceed the defined first request rate threshold;
program instructions to, in response to predicting the next data block, store, on the first TFTP server, the next data block in the global cache;
program instructions to store, on the first TFTP server, multiple copies of the data blocks of the first portion of the data file on a plurality of TFTP servers to enable a high availability for reading one or more blocks in the global cache;
program instructions to monitor, on the first TFTP server, the one or more continuous data blocks in the global cache to determine if the request rate for an end data block of the one or more continuous data blocks has fallen below a defined second request rate threshold, wherein the defined second request rate threshold is a configurable limit that defines when the one or more continuous data blocks in the global cache can be removed from the global cache; and
program instructions to, in response to determining that the end data block of the one or more continuous data blocks has fallen below the defined second request rate threshold, remove, on the first TFTP server, the end data block from the one or more continuous data blocks stored in the global cache.

* * * * *